United States Patent
Shultz et al.

(10) Patent No.: US 7,269,482 B1
(45) Date of Patent: Sep. 11, 2007

(54) IN-VEHICLE INFORMATION SYSTEM AND SOFTWARE FRAMEWORK

(75) Inventors: Roger K. Shultz, Iowa City, IA (US); Gregory A. Dils, Tiffin, IA (US); J. Jay Lash, Vinton, IA (US); Ron E. Stahlberg, Iowa City, IA (US); Hassanayn Machlab El-Hajj, Coralville, IA (US); Andrew Smith, Cedar Rapids, IA (US); James C. Griffin, Iowa City, IA (US)

(73) Assignee: Vetronix Corporation, Santa Barbara, CA (US)

( * ) Notice: Subject to any disclaimer, the term of this patent is extended or adjusted under 35 U.S.C. 154(b) by 0 days.

(21) Appl. No.: 10/127,278

(22) Filed: Apr. 22, 2002

Related U.S. Application Data

(60) Provisional application No. 60/285,261, filed on Apr. 20, 2001.

(51) Int. Cl.
*G06F 11/22* (2006.01)
*G06F 9/00* (2006.01)

(52) U.S. Cl. .......................... 701/1; 340/988
(58) Field of Classification Search ................ 701/1, 701/29, 33, 35; 340/988; 707/4, 10, 102; 709/249, 310, 300
See application file for complete search history.

(56) References Cited

U.S. PATENT DOCUMENTS

| | | | |
|---|---|---|---|
| 5,442,633 A * | 8/1995 | Perkins et al. ............. 370/94.1 |
| 5,732,074 A * | 3/1998 | Spaur et al. ................ 370/313 |
| 5,884,202 A * | 3/1999 | Arjomand .................... 701/29 |
| 5,931,877 A * | 8/1999 | Smith et al. ................... 701/29 |
| 5,982,368 A * | 11/1999 | Toffolo et al. .............. 345/835 |
| 6,097,316 A * | 8/2000 | Liaw et al. ................. 340/988 |
| 6,195,661 B1 * | 2/2001 | Filepp et al. ............... 707/102 |
| 6,202,008 B1 * | 3/2001 | Beckert et al. ............... 701/33 |
| 6,351,706 B1 * | 2/2002 | Morimoto et al. .......... 701/208 |
| 6,353,785 B1 * | 3/2002 | Shuman et al. ............... 701/48 |
| 6,370,455 B1 * | 4/2002 | Larson et al. ................. 701/33 |
| 6,381,538 B1 * | 4/2002 | Robinson et al. ........... 701/211 |
| 6,430,164 B1 * | 8/2002 | Jones et al. ................. 370/313 |
| 6,499,028 B1 * | 12/2002 | Brock et al. ................... 707/4 |
| 6,505,100 B1 * | 1/2003 | Stuempfle et al. ............. 701/1 |
| 6,535,743 B1 * | 3/2003 | Kennedy, III et al. ...... 455/456 |
| 6,571,136 B1 * | 5/2003 | Staiger ........................ 700/48 |
| 6,728,796 B2 * | 4/2004 | Aue et al. ..................... 710/22 |

* cited by examiner

*Primary Examiner*—Dalena Tran
(74) *Attorney, Agent, or Firm*—Koppel, Patrick, Heybl & Dawson

(57) ABSTRACT

A software framework and method for generating a vehicle information system includes a communications manager that manages data inputs and outputs between the framework and vehicle devices, a data warehouse that registers abstract versions of vehicle device data, and a display manager that controls data display on a user interface. The data in the data warehouse is stored in an abstract format, without reference to the specific protocol or platform used to obtain the data, to make the data accessible to modular applications and devices for generating a vehicle information system display.

16 Claims, 6 Drawing Sheets

IN-VEHICLE INFORMATION SYSTEM AND SOFTWARE FRAMEWORK

This application claims priority to U.S. Provisional Patent Application Ser. No. 60/285,261, filed 20 Apr. 2001, which is incorporated herein by reference in its entirety.

FIELD OF THE INVENTION

The present invention is directed to an in-vehicle information system framework that can present information from multiple sources to a vehicle operator.

DESCRIPTION OF THE RELATED ART

Motor vehicles are undergoing dramatic changes in their capabilities due to the use of computer-based technologies. Early use of computer-based technologies in motor vehicles enhanced vehicle capability and performance. Examples of these technologies include electronic fuel injection for control of engine performance, antilock braking systems to help a driver retain control on slippery roads, and cruise control to relieve a driver's tedium during long stretches of driving.

More recent use of computer-based technologies are aimed at enhancing the capabilities of the driver, including driver safety, performance, and convenience. Currently available technologies include electronic steering and suspension, keyless and remote entry systems, devices that remember a driver's seating and mirror positions, and radio settings. New technologies are also available for navigation on dead-reckoning technology and global positioning systems.

Because more information is now available to the driver than ever before, there is a desire for a system that can manage this information in a coherent manner that will not adversely affect driver performance.

Further, because information may be obtained from many different sources and be incorporated into many different vehicles, there is a desire for a framework that can integrate information from disparate technologies and sources into a coherent system without requiring expensive, lengthy software redevelopment to accommodate these differences.

SUMMARY OF THE INVENTION

Accordingly, one embodiment of the invention is directed to a framework for a vehicle information system having a user interface, at least one device that generates data to be shown on the user interface as a display, and at least one application, the framework comprising a communications manager in communication with said at least one device, a data warehouse in communication with the communications manager, wherein the communications manager manages input and output of data between the data warehouse and said at least one device and wherein the data warehouse registers the data from said at least one device and makes the registered data accessible to said at least one application, and a display manager in communication with the data warehouse and said at least one user application, wherein the display manager selectively displays on the user interface data requested from the data warehouse by said at least one application.

Another embodiment of the invention is directed to a method of generating a display on a user interface in a vehicle information system, the system having at least one device that generates data to be shown on the user interface as a display and at least one application, the method comprising the acts of registering data from said at least one device into a data warehouse, wherein the registered data is accessible to said at least one application and independent of a characteristic of said at least one device, requesting data from the data warehouse via said at least one application, and selectively displaying the data from the requesting act onto the user interface.

Other embodiments will be understood in light of the description and drawings below.

DESCRIPTION OF THE PREFERRED EMBODIMENTS

One embodiment of the present invention is an in-vehicle information system and a corresponding software framework. The in-vehicle information system framework according to one embodiment of the invention may, for example, integrate information from multiple information sources via an abstract interface in the software framework and selectively and dynamically present the information to a vehicle operator. In one embodiment, data may be prioritized and selectively displayed based on predetermined priorities.

Further, the framework according to one embodiment may do one or more of the following: integrate information services from both on and off-board the vehicle, construct the in-vehicle information system from modular software components (e.g., components that are pre-built for known types of vehicle hardware), construct a graphical user interface from modular software components (e.g., components that are pre-built for vehicle displays), dynamically share data between sub-systems within the in-vehicle information system, control state changes in the in-vehicle information system, and provide real-time embedded graphics display software. In one embodiment, both the devices from which data values are obtained and applications that request the data are treated as abstract modules by the framework, allowing easy data sharing between devices and among applications.

Hardware System Environment

Figure 1:
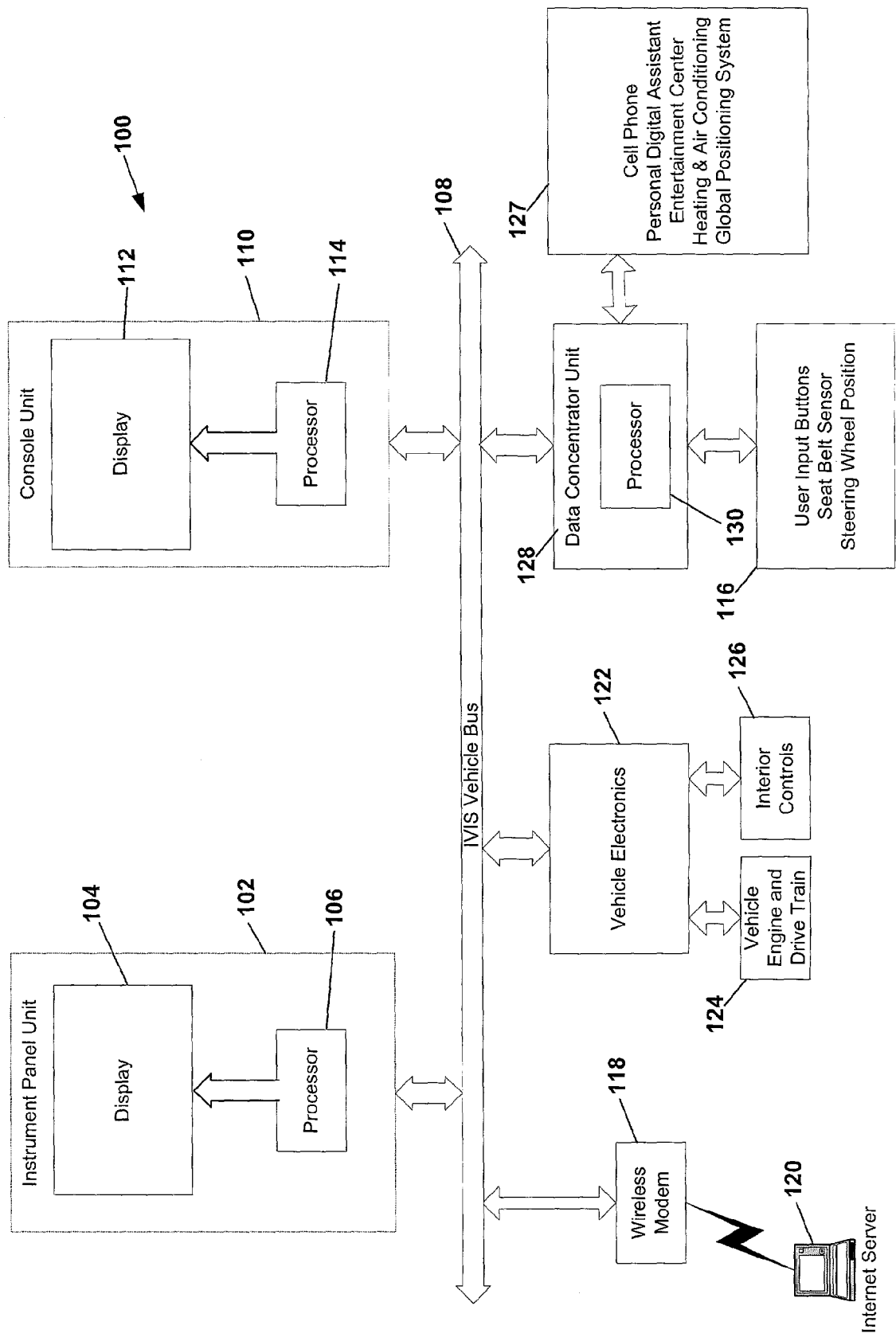
FIG. 1 is a representative diagram of a vehicle information system hardware configuration used in conjunction with a framework according to one embodiment of the invention.

FIG. 1 illustrates one embodiment of a hardware system 100 environment in which a software framework according to the invention may be used. The inventive framework can be used to generate and be used within any in-vehicle information system such as the system described in commonly assigned, co-pending U.S. patent application Ser. No.

09/175,834, filed 19 Oct. 1998, the disclosure of which is incorporated herein by reference in its entirety. The hardware system 100 includes a first user interface, such an instrument panel unit 102, that includes a display 104 and a corresponding processor 106. Generally, the instrument panel unit 102 may present graphics corresponding to a conventional vehicle instrument panel, such as a speedometer, a tachometer, warning signals, etc. The processor 106 sends and receives graphics data from an in-vehicle information system vehicle bus 108, filters the data according to predetermined parameters (explained in greater detail below), and uses the filtered data to render graphics on the display 104.

The hardware system 100 also includes a second user interface, such as a console unit 110, that provides a control interface for the user. Like the instrument panel unit 102, the console unit 110 includes a display 112 and a corresponding processor 114. The processor 114 also sends and receives data from the vehicle bus 108. In one embodiment, the graphics shown in the display 112 in the console unit 110 are synchronized by the processor 114 with user input device signals from user interaction with vehicle devices 116 (e.g., window buttons, sensors, etc.). For example, if a user presses a button in the vehicle, the display 112 may be changed by the processor 114 to indicate the pressing of that button. Further, the processor 114 may send control signals over the vehicle bus 108 to the vehicle devices 116 to control those devices. If the processor 114 generates control signals that raises the window position due to, for example, conditions set by the software framework, the processor can change the position of the window by sending control data to the window, without any action by the user.

One embodiment of the hardware system 100 also includes a wireless modem 118 for allowing off-vehicle communication with the instrument panel unit 102 and the console unit 110. In one example, the modem 118 provides a communication link between and Internet server 120 and the vehicle bus 108.

Data to be displayed on the displays 104, 112 is obtained from vehicle electronics 122, the wireless modem 118, and/or the data concentrator unit 128 which can be any device or control any device in the vehicle that generates electronic signals. A vehicle engine and drive train 124 and interior controls 126 are shown in FIG. 1 for illustrative purposes only and are not meant to be limiting in any way. The data from the vehicle electronics 122 can be used to, for example, generate safety and/or diagnostic screens on the displays 104, 112 to notify the vehicle user of a vehicle operation condition. More particularly, possible data to be shared with the instrument panel unit 102 and console unit 110 include, for example, road speed, engine temperature, seat positions, window positions, coolant temperature, and the like. Note that data can be sent from the instrument panel unit 102 and the console unit 110 to the vehicle electronics 122 to control vehicle device 124, 126 operations as well. For example, the console unit may transmit a signal to adjust seat position and the instrument panel unit may transmit a signal that sets the maximum road speed or a transmission operating mode.

In one embodiment of the system 100, additional peripheral devices 127, such as a cell phone, a GPS system, etc., are also incorporated into the system's operation. To manage inputs from and outputs to multiple vehicle devices 116 and peripheral devices 127, a data concentrator 128 having an associated processor 130 may be used to control data flow to and from the vehicle bus 108. In one embodiment, the data concentrator 128 combines data from the vehicle devices 116 and peripheral devices 127 into multiple message words, with data in the bit fields within each message word, and transmits data to and from the instrument panel unit 104 and the console unit 110 via the message words.

In-Vehicle Information System Framework

Figure 2:
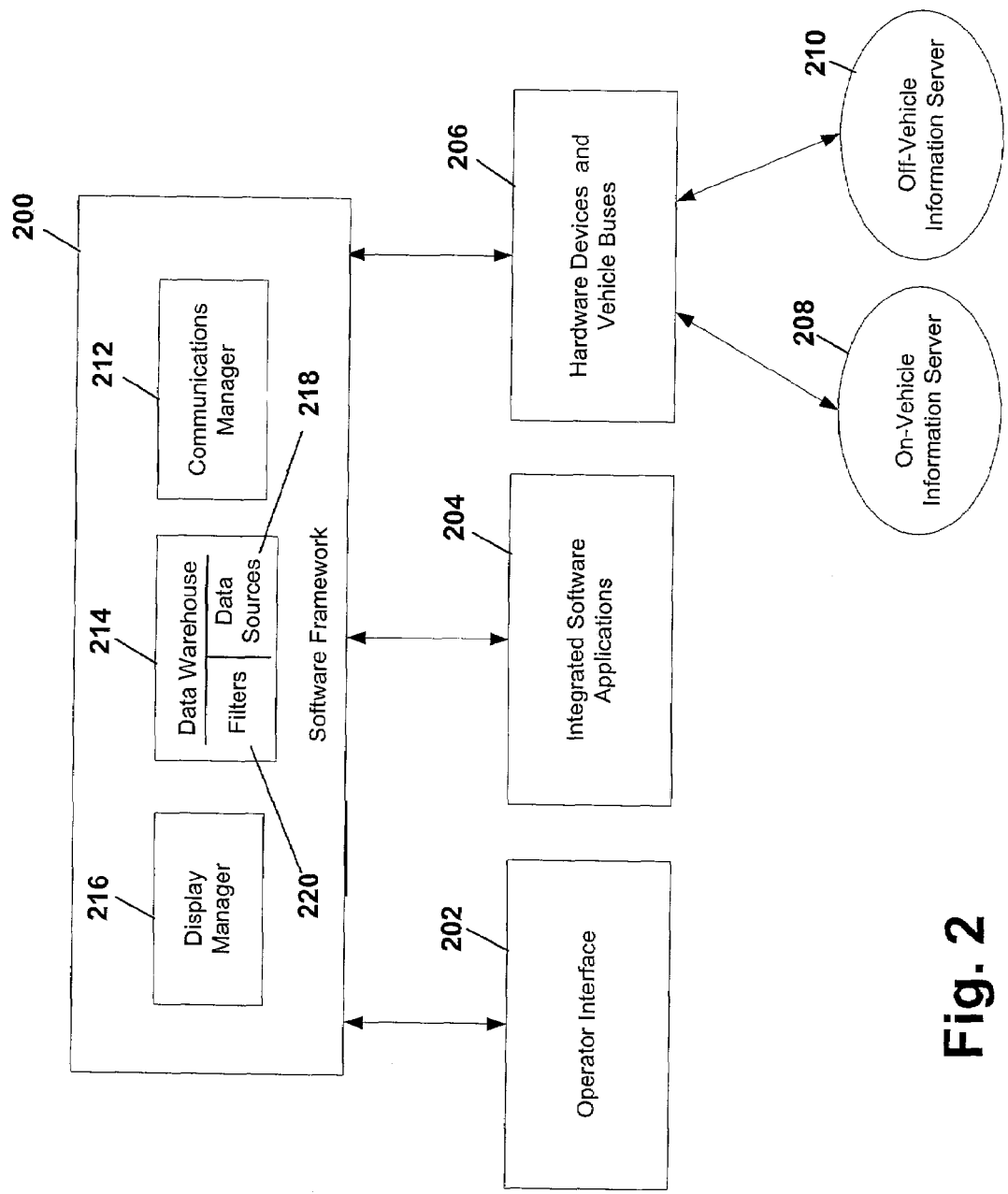
FIG. 2 is a block diagram illustrating an operating environment within a vehicle using a framework according to one embodiment of the invention.

FIG. 2 illustrates one embodiment of the relationship between the hardware system 100 shown in FIG. 1 and a reusable in-vehicle information system software framework 200 according to one embodiment of the invention. The framework 200 described below is generally a reusable software framework where interfaces can be constructed from modular software components that are connected to the framework 200 without any further modification. Within the vehicle the framework 200 provides an infrastructure for integrating a user interface 202 (e.g., the instrument panel unit 102 and the console unit 110), modular software applications 204, and devices and/or vehicle busses 206 (e.g., the vehicle electronics 122). Further, the framework 200 can incorporate data from both on and off the vehicle, such as from an on-vehicle information server 208 and an off-vehicle information server 210 (e.g., the Internet server 120 shown in FIG. 1).

In one embodiment, the framework 200 provides interfaces for component-based construction of operating system interfaces, communications interfaces, and for real-time data sharing between applications. For example, the reusable software framework 200 may provide programming interfaces for constructing a component-based graphical user interface from software components that are pre-built for vehicle displays. Further, the framework 200 may include compiled code libraries for input-output streams, data filters, displayable components, graphics rendering, a data warehouse, a communications manager, and display manager, all of which can be accessed and shared by multiple applications to generate the information system. In essence, the framework 200 offers a standard framework in which applications and devices can be joined in a modular fashion to share data and generate customized in-vehicle information systems even if the devices and other sources of data use different protocols and have different platforms.

The framework 200 in one embodiment of the invention includes a communications manager 212, a data warehouse 214, and a display manager 216.

Communications Manager

The communications manager 212 provides an abstract interface between the framework 200 and devices and busses 206 that communicate with the framework 200. The communications manager 212 is responsible for establishing communication with other external devices, such as on-vehicle and off-vehicle information servers 208, 210, and invoking low-level routines necessary to support specific communication protocols. In one embodiment, input-output modules and/or device modules are registered in the communications manager 212 to allow an abstract interface between those modules and the framework 200. Registering input-output modules allow variation of bus message protocols, thereby allowing changes to the formats of messages to and from the vehicle bus 108 without changing the definitions of corresponding data entries stored in the data warehouse 214. Similarly, registering device modules allows variation of messages sent to and from the registered devices 206, thereby allowing changes to the formats of messages to and from the devices 206 without changing the definitions of corresponding entries in the data warehouse 214.

In one embodiment, input-output streams may be provided for standard vehicle bus protocols and registered in the communications manager 212 with a unique identifier associated with each stream. A stream may include the underlying communication hardware controller, the protocol interpretation layer, and the component that transfers data to or from the registered devices 206. The communications manager 212 then tracks the available streams in the system based on the registered information. By providing a unique identifier with each stream, applications 204 can check whether a given stream exists and whether that stream is functional in the in-vehicle information system.

Communication is not limited to what are typically considered communications devices, such as serial ports or Ethernet connections. The communications manager 212 may also administrate communication and device modules (FIG. 4, explained in greater detail below), such as RS232 ports or hardware devices, switches and optical encoders. In one embodiment, the communications manager 212 administrates devices 206, 208, 210 by registering and unregistering the devices 206, 208, 210 in the data warehouse 214 so that the applications 204 can determine whether data from the devices 206, 208, 210 are available. In one embodiment, the communications manager 212 may also maintain, shut down, or reset the devices 206, 208, 210 if needed.

To receive data from engine control units, for example, the communications manager 212 uses a network protocol that meets the existing requirements of in-vehicle control systems. Two examples of network protocols designed specifically for in-vehicle networks are Controller Area Network (CAN) and SAE J-1708. Other input data may be received from a driver or other user via a user interface, such as buttons, switches, a mouse, a knob, a touch pad, a touch screen display, or voice recognition technology, for example, via any known data communication method. Off-vehicle system inputs may be received by Ethernet, RS-232, PCMCIA (Personal Computer Memory Card International Association) or IrDA (Infrared) Data Association) connections, for example, via any known data communication method. Alternate embodiments in which the communications manager 212 receives data using additional or differing protocols and connections for on-vehicle systems, off-vehicle systems, and user interfaces will be readily apparent to one skilled in the art and are contemplated as within the scope of the invention.

Data Warehouse

The data warehouse 214 provides an abstract interface for available vehicle data, such as data generated by the devices 216, 208, 210, and allows the devices 206, 208, 210 to share data stored in the data warehouse 214 regardless of the platform and/or protocol used to obtain the original data. The data warehouse 214 provides storage for persistent system data and filtering of real-time vehicle data. Generally, as the framework 200 receives data, it is standardized and then stored in the data warehouse 214, allowing access of the data by the applications 204 and by other devices 206, 208, 210.

The data warehouse 214 may include a plurality of data sources 218, each data source 218 corresponding to one data value that can be delivered to applications 204 on request. Data sources 218 are locations in the data warehouse 214 to which an interface or application will took to for data values for display or processing. Data listeners are locations that applications or interfaces look to send values to based on conditions, triggers or user actions. Note that a given data warehouse "data source" 218 location can act as a source to one application and a listener for another application. For clarity, the term "data source" as used in this application will refer to both data sources and data listeners. In one embodiment, the data sources are individual locations in the data warehouse 214 capable of holding values from both on-vehicle and off-vehicle devices. Examples of possible values include vehicle speed, engine RPM, cruise control settings, high/low beam states, radio station settings, e-mail data, contact lists, maps, and/or GPS data.

In one embodiment, data received by the framework 200 is standardized, optionally filtered by one or more filters 220, and stored in the data sources 218 for access and use by the applications 204 and other devices 206, 208, 210. In one embodiment, standardizing the data consists of converting a vehicle's data identifier to an internal identifier and converting the data into a format that is compatible with requirements of the data source 214 (e.g., converting temperature data from Fahrenheit to Centigrade). To facilitate standardizing in one embodiment, all data received by the data warehouse 214 contains a device's data, the device's internal identifier for the data source 214 and which interface the data came from. In one embodiment, the data is a number reflecting a magnitude (e.g., "60") and the internal identifier indicates the units and system corresponding to the magnitude (e.g., "speed in MPH").

When data is added to the data warehouse 214, the data warehouse 214 checks for an existing entry that has the same internal identifier. If an existing entry is found, the new data replaces the existing entry. If no existing entry is found a new data source 218 is created in the data warehouse 214. Retrieving data from the data source 218 does not delete, nullify or invalidate the entry for that identifier. In one embodiment, each entry in the data source 218 contains a time stamp to determine the age of the data. The time stamp is the time at which the current data value was entered into the data source 218. After a given value is stored in the data source 218, other applications can look-up the data source 218 and monitor any value changes in that data source.

If one or more filters 220 are being used in the data warehouse, filtering is applied based on a filter list retrieved from the data warehouse 214. The filter list identifies all of the filters in the framework 200 that could be applied to incoming data. If the filter list contains an entry for the internal identifier of the received data, the received data is passed on to a data source 218. If no entry exists in the filter list, the received data is discarded. Discarding such data reduces the total amount of data maintained by the data warehouse 214 by removing data that the in-vehicle information system will not use. In one embodiment, multiple filter lists are maintained by the data warehouse 214 to reduce re-configuration overhead if the in-vehicle information system changes operating modes.

The data warehouse 214 may also provide messaging facilities in the in-vehicle information system framework 200, notifying applications 204 if a predetermined event occurs, such as when a specific data value is received or a condition met on request. In one embodiment, the data warehouse is a registry of data sources and data listeners (e.g., devices that provide those data values). The data sources provide real-time data notification to registered observers if, for example, a predetermined condition is met. Data source observers can be any application 204 in the system 200 requesting data values to be set when a selected condition occurs. Data listeners may be registered to observe data sources from display components or applications. Further, they may serve as agents to transfer data out of one application and/or device and into another application and/or device; for example, direction data from a GPS system can be stored in the data warehouse 214 and then accessed by a personal digital assistant for portability.

Using the "speed in MPH" data source 218 example above for illustrative purposes only, multiple applications (e.g., a digital gauge, cruise control, and a navigation system) may all access the "speed in MPH" data source 218 and have their own respective conditions and requests for notification of the value in that data source 218. The data warehouse 214 may allow all of the applications to specify their own notification conditions; if a given value change occurs that meets the conditions of more than one application, the data warehouse 214 allows all of the relevant applications to be notified of the change substantially simultaneously rather than limiting communication to just one application.

Thus, in this example, the applications 204 may interact with the data warehouse 214 to obtain values such as "speed in MPH" without knowing which specific interface and/or protocol was used to obtain the information. The data warehouse 214 provides a registry of the defined system parameters, and provides a mechanism for applications to define additional parameters. Because the data warehouse 214 stores only raw data values without regard to how those values were obtained, the data warehouse 214 offers abstract data sharing between individual applications. To exchange information, for example, two applications only need to agree on the name of a data source in the data warehouse 214; one application can place data into the data source and the other application can register itself to be notified when that data source is located. In short, the data warehouse 214 acts as the common interface between the applications.

The data warehouse 214 and the communications manager 212 together allow dynamic sharing of data between multiple applications 204. More particularly, by using the communications manager 212 to access registered vehicle data sources 218 in the data warehouse 214, the framework 200 allows applications 204 and devices 206, 208, 210 to use and share both on and off vehicle data.

Display Manager

The display manager 216 allows multiple competing applications controlled access to a shared physical display 104, 112 while still providing efficient rendering of the desired display output. In one embodiment, different applications 204 will essentially re-use the same physical screen space on the display 104, 112, depending upon the set of applications 204 and associated user interface designs (e.g., a navigation interface, a cell phone interface, an HVAC interface, etc.) for the display 104, 112. The display manager 216 directs which applications will display data on the display 104, 112 via predetermined rules, or "transitions", that determine which data will be displayed during a given condition. This provides for a more efficient interface for the vehicle occupants because the display manager 216 selects the most relevant data to be displayed and the optimal display location for display data from each application. It also allows applications 204 having different characteristics and protocols to be hosted on the same physical hardware without requiring separate, independent displays for each application 204.

In one embodiment, different applications 204 operate independently and are not made aware of displays generated by other applications 204. Each application 204 is allowed to request access to a portion or portions of the display screen 104, 112 and describe the conditions under which that access will occur. In one embodiment, the conditions may include transitions as well as the individual values that drive a graphical object's behavior, such as the value that causes an individual icon to be displayed. Transitions affect the display as a whole and individual values affect single user interface components, such as a gauge, icon, and list or text item.

The display manager 216 then decides when the request will be granted based on the transitions associated with a given application and their relationships with current data values and informs the appropriate application(s) when their data is allowed to be displayed. In one embodiment, the display manager 216 generates a display from software components that are pre-built for vehicle displays, such as display rendering routines in a graphics library. The display manager 216 may also control the location of information written to the display 104, 112 to ensure that different applications 204 do not generate displays that overlap or otherwise interfere with each other.

In one embodiment, any potential information or graphic objects to be displayed are registered with the display manager 216. The display manager 216 then determines which information will be displayed based on, for example, rules and transitions specified by the applications 204. By focusing only on content registered with the display manager 216, no time is wasted preparing content that will never be selected by the display manager 216 for display.

Data Flow in the Framework

Figure 3:
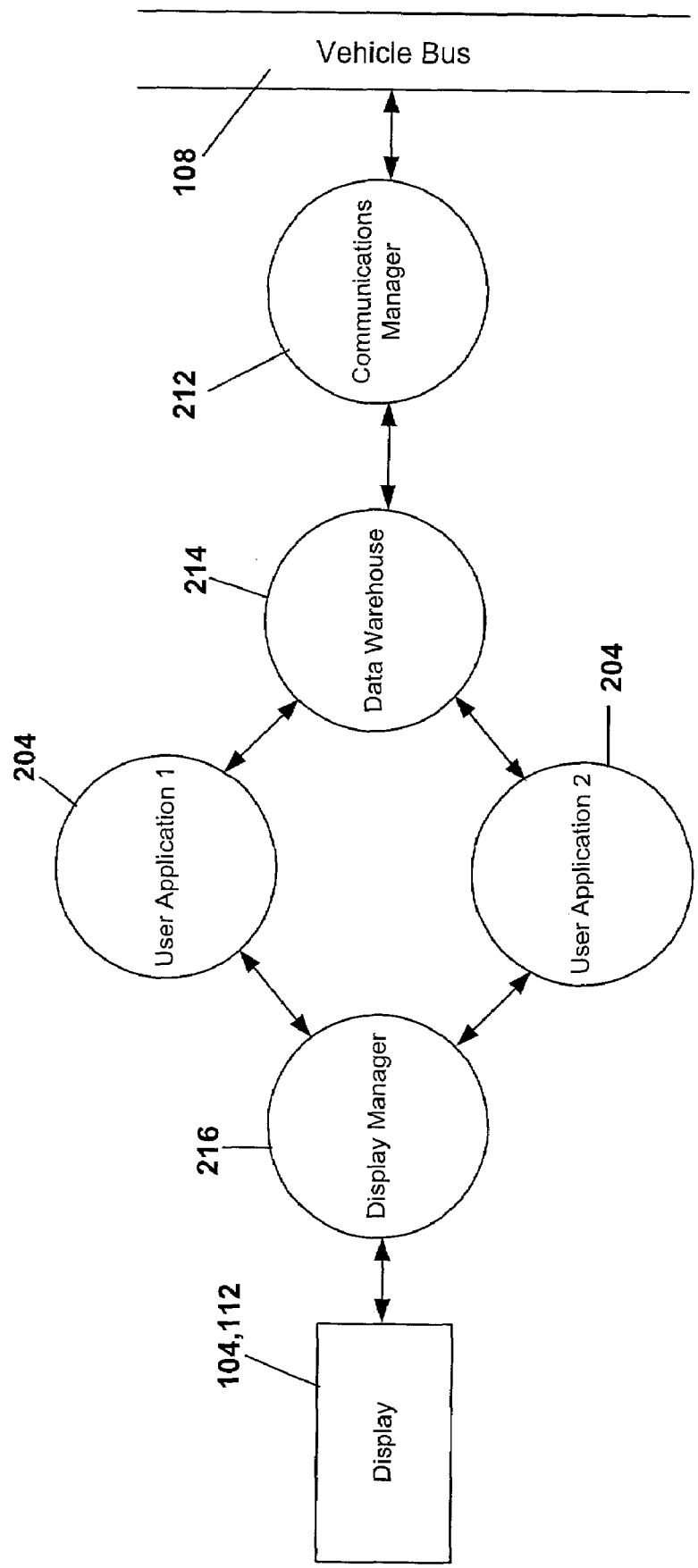
FIG. 3 is a representative diagram illustrating a data flow in a framework according to one embodiment of the invention.

FIG. 3 is a high-level block diagram illustrating the data paths in one embodiment of the in-vehicle information system framework 200. As noted above, the framework 200 may include three primary service components: a communications manager 212, which interprets vehicle bus 108 traffic; a data warehouse 214, which presents a registry for software applications 204 to access the interpreted data; and a display manager 216, which presents information to the driver and/or users.

As represented in FIG. 3 and explained in greater detail above, the communications manager 212 manages the input and output of data values between the vehicle bus 108 and the data warehouse 214, updating the data values in the data warehouse 214 in real time. The data warehouse 214 registers and interprets the data, making the data available for universal access by the software applications 204. The software applications 204 then interact with the data warehouse 214 to access the data required to perform their tasks, requesting access from the display manager 216 to present information to the vehicle occupants via the display 104, 112. The display manager 216 synchronizes and prioritizes graphical user interfaces for the =applications 204.

Note that the user applications 204 are modular and can be changed, modified, added to and removed from the framework 200 to modify the resulting in-vehicle information system. This modularity allows a designer to change the characteristics of the information system without creating a completely new software program. As explained above, the data abstraction provided by the data warehouse 214 allows disparate applications to access and share the same data even if they operate on different platforms and/or with different protocols.

In-Vehicle Information System Framework Architecture

Figure 4:
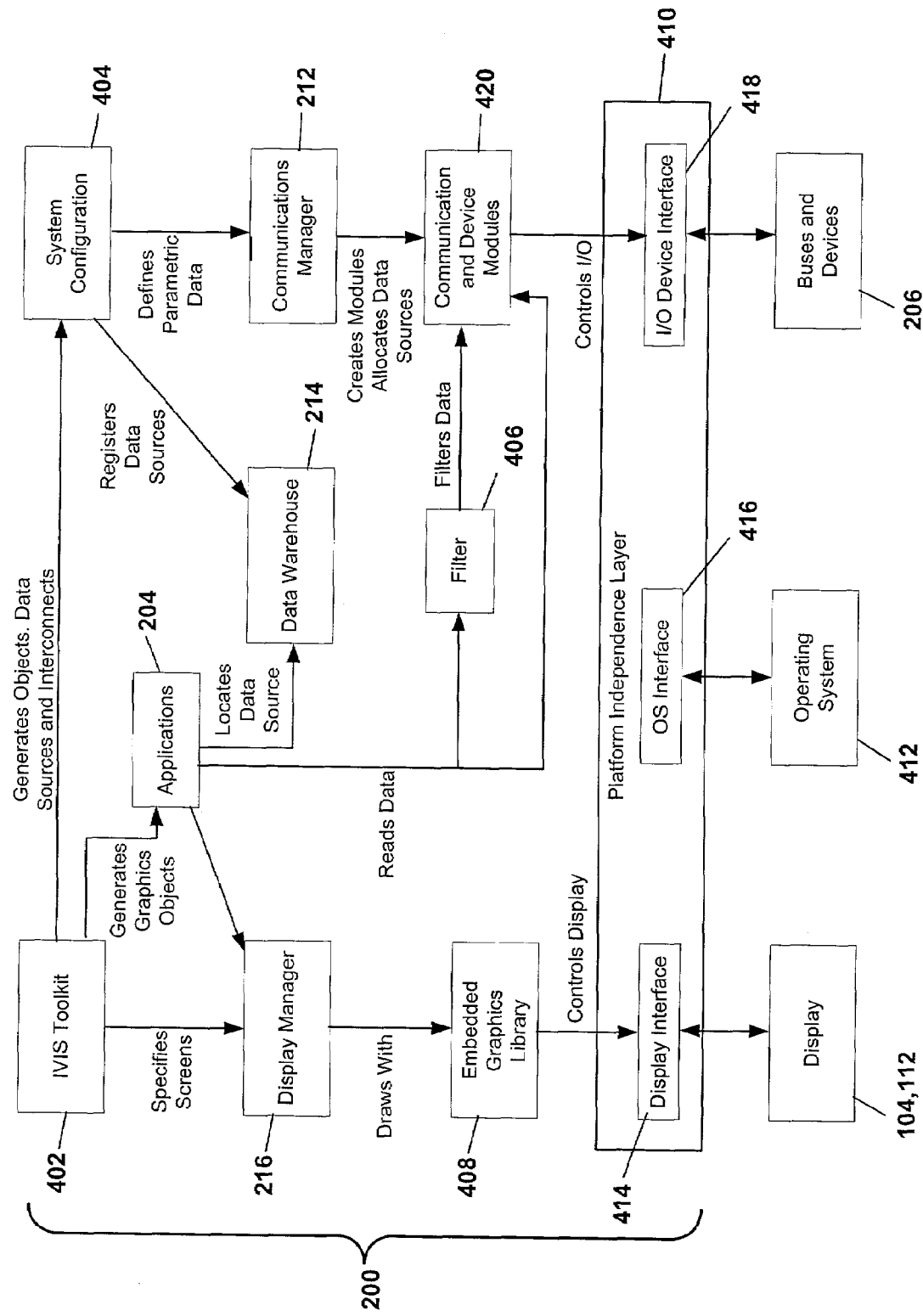
FIG. 4 is a block diagram illustrating a software architecture for a framework according to one embodiment of the invention.

FIG. 4 illustrates one embodiment of a software framework 200 in greater detail. As explained above, the framework 200 contains a communications manager 212, a data warehouse 214, and a display manager 216. These three components can work in conjunction with other components in the framework 200 to generate and form a part of an in-vehicle information system. These additional components will be described in greater detail below.

Referring to FIG. 4, an in-vehicle information system toolkit 402 acts as a resource library containing graphics, screen formats, objects, data sources, and data interconnections for use by other modules in the framework 200. A system configuration module 404 receives resources from the toolkit 402 and creates and organizes resources, such as hardware interfaces and threads of execution, that initialize the hardware, communications, and display subsystems. Among these responsibilities are the creation and initialization of the data warehouse 214, the communications manager 212, and the display manager 216. The system configuration module 404 is also responsible for the creation of any threads of execution required by the functioning in-vehicle information system. A primary responsibility of the system configuration module 404 is to create, define, and register data sources in the data warehouse 214.

In one embodiment, the system configuration module 404 registers hardware components 127 (FIG. 1) with the communications manager 212, the data warehouse 214, and the display manager 216 to route data from, for example, the hardware components 127 to trigger condition software (explained in greater detail below) that controls the display manager 216. The system configuration module 404 may also register user input components 116 (FIG. 1) with the communications manager 212, the data warehouse 214, and the display manager 216 to route data from, for example, the user input components 116 to the hardware components 127 and/or the vehicle busses.

The framework 200 may also include a filter module 406 to condition data that is read from or written to the data warehouse 214. Note that in one embodiment, many of the operations for data values received from devices 206 can essentially be labeled as "filtering" operations. Examples of filters in the filter module 406 include smoothing, unit conversion, clamping, and scaling. The filter module 406 provides an interface for objects, such as displayable objects for a given application, to use data that has been filtered from its original representation.

The data filters are used for conditioning data that is read or written to a stream. One possible filter may, for example, an average speed filter that averages vehicle speed over the last ten values stored in the "speed in MPH" data source. The average vehicle speed may then be made available to applications and/or stored back in the data warehouse 214 as another data source value. In this example, the filter reduces processing requirements for applications that check if the speed exceeds or drops below a certain threshold if, for example, the vehicle speed jitters above and below the threshold set by an application. Other possible filters may include, but are not limited to, mathematical operators, averages, high pass, low pass, Boolean operations, unit converters, etc.

Multiple filters may also be provided, each with a specific interface that sets the filter's properties. In one embodiment, the filters are plug-and-play components for use with any data source or other filters. They can be registered as filtered data sources or data listeners in the data warehouse. Further, filters may be chained together, output-to-input, to form a filter pipe in the filter module 406. Filters are allowed to have local storage as required to complete the required computations and store the result. They can also generate events that result in registered listeners being notified of when certain conditions have occurred.

An embedded graphics library 408 provide a standard API for displaying information on the display 104, 112. The library 408 provides the applications 204 access to graphical resources for displaying their corresponding data. In one embodiment, the libraries are an embedded real-time software solution to high quality anti-aliased graphics. In one embodiment, the embedded graphics library 408 contains display-rendering routines that support vector and bitmap drawing commands (e.g., draw line, draw rectangle, fill rectangle, draw text, and draw bitmap). The graphics library 408 may also use a real-time embedded graphics display software that displays smooth, anti-aliased graphics, animates graphical components and provides the underlying drawing functions for the display 104, 112.

Further, in one embodiment, the graphics display library 408 isolates changes to the graphics display hardware, making the hardware platform independent. The graphics display library 408 may be accessed by, for example, directly through a supplied API or by components included in the display 104, 112. Regardless of the manner in which the graphics display library 408 is accessed, the graphics library 408 performs the operation requested by the display manager 216 (e.g., draw a line) to an image buffer (not shown). Data stored in the image buffer is ultimately displayed on the display 104,112. In this manner, an entire image may be generated by the display manager 216 using the graphics display library 408 without relying on the features of any particular display hardware; the entire image is generated in software, using the framework 200, before ever being sent to the display 104, 112.

A platform independence layer 410 may be incorporated into the in-vehicle information system framework 200 to isolates the in-vehicle information system from changes to the display hardware 104, 112, operating system 412, and the device hardware 206. Generally, the platform independence layer 410 offers a standard interface between the display 104, 112 and devices 206 and the framework 200. In one embodiment, the platform independence layer 410 includes a display interface 414, an operating system interface 416, and an input/output interface 418. The platform independence layer allows the framework 200 to support new vehicle platforms simply by creating new platform interface components rather than creating an entire new information system for the new platform.

In one embodiment, the platform independence layer 410 conducts tasks that are normally required of device hardware and/or the operating system for a given device (e.g., determining how to allocate memory, stopping execution of a thread). The platform independence layer 410 maps these operations to the actual required commands for a specific hardware platform. In other words, the platform independence layer 410 works as a translator between the framework 200 and the hardware used in the vehicle information system (e.g., the display 104, 112 and the devices 206) so that the framework 200 can be used by any hardware whose parameters are supported by the layer 410. For example, the input-output device interface 418, in conjunction with a communication and device module 420, allows for a "plug-and-play" system because they provide on standardized vehicle network interface protocols and connectivity. This permits independent third-party vendors to design devices, tools and other in-vehicle products that can use the framework 300 for graphics and display support.

As noted above, the display manager 216 may generate a display from software components that are pre-built for vehicle displays. The display manager 216 may, for example, select displayable software components from the graphics library 408, setting their properties, attaching them to vehicle data values, and linking or registering them with the framework's management sub-systems. In one embodiment, when the display manager 216 allows a given application 204 to write its data to the display 104, 112, the application will access the embedded graphics library 408 to perform all rendering to the display 104, 112 via the display interface 414 in the platform independence layer 410.

Trigger Condition Example

Figure 5:
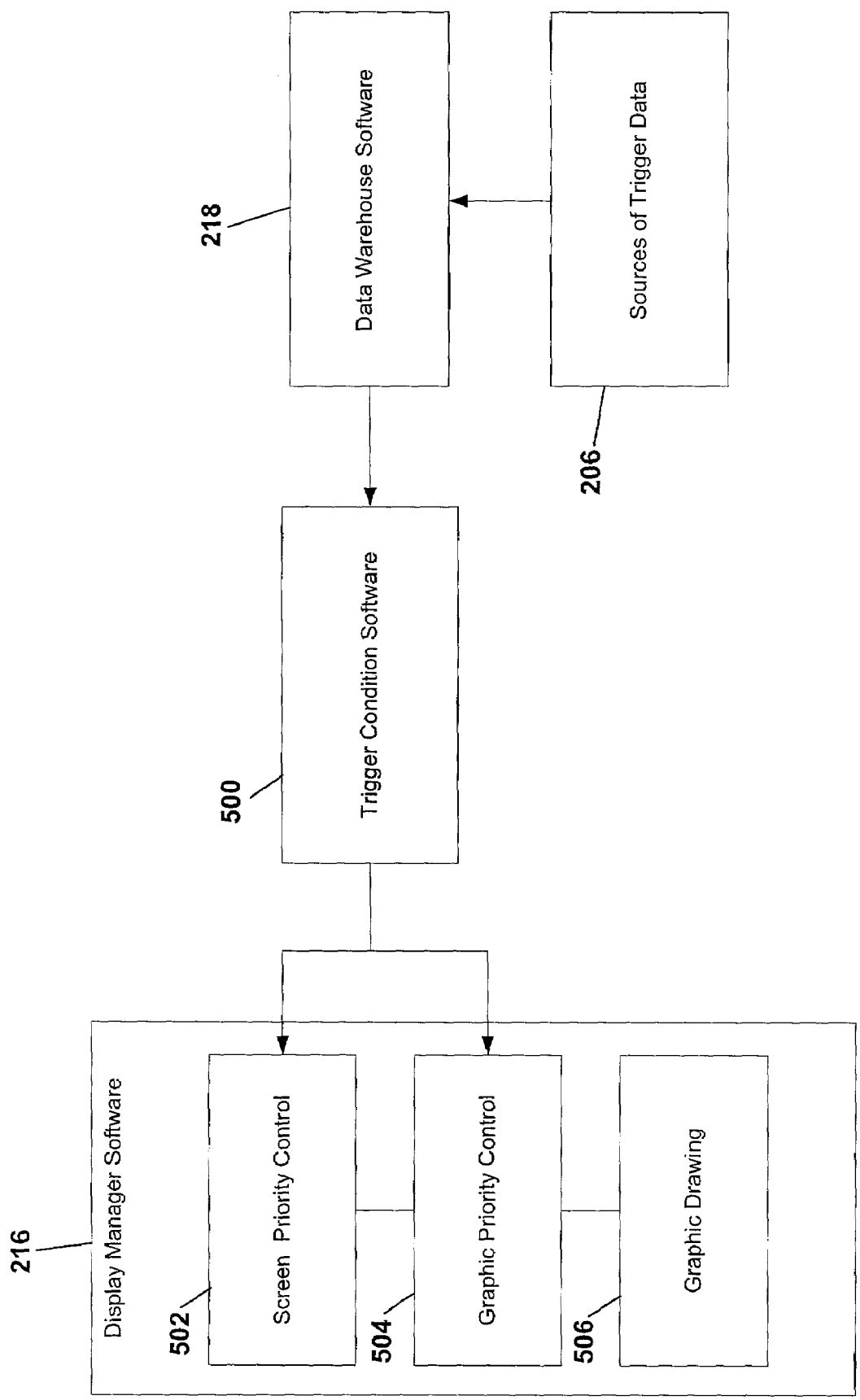
FIG. 5 is a block diagram illustrating an example of software framework operation using trigger condition software.

FIG. 5 illustrates one example of how the inventive framework 200 operates using triggering conditions as a means to control the display. In this embodiment, the display manager 216 is a framework module that runs within both the instrumentation panel unit 104 and the console unit 110 (FIG. 1). As explained above, the display manager 216 selects graphic components (e.g., text, gauges, indicator icons, etc.) to draw based on priorities and transition rules to create one or more screens.

In one embodiment, trigger condition software 500 is incorporated in the framework, acting as a gate between the data warehouse 218 and the display manager 216. As noted above, data, including trigger data, are obtained from devices and busses 206 and sent to the data warehouse 218 for registration. The trigger condition software 500 in one embodiment contains trigger conditions or predefined rules of priority used to determine when to switch the display from one screen to another. Switching to another screen may involve, for example, displaying an entirely different image on the display 104, 112 or changing the composition and/or configuration of the current image on the display 104, 112. When a data value from the data warehouse 218 goes over or under a threshold value set in the trigger condition software, the display manager 216 is notified of the event.

In one embodiment, trigger conditions are set by the system designer to warn the driver of abnormal or potentially dangerous conditions that occur in the vehicle. For example, the display device 104, 112 displays gauges for vehicle information such as temperature, oil pressure and tire pressure. If the associated levels are within acceptable ranges, then the gauges displaying such levels may be replaced with other information as desired by the driver. For example, the driver may choose to replace the gauges on the display with an electronic address book or phone book. However, if during operation of the vehicle the data used for a gauge that is not being displayed falls out of a normal operating range (such as a dramatic increase in temperature), then the display is automatically redrawn to alert the driver of the condition and to display the particular gauge. In this example, the screen having the gauges is given higher priority above other screens.

To prioritize items and screens on the display based on the trigger conditions, the display manager 216 in this embodiment may include a screen priority control module 502 and a graphic priority control module 504. The screen priority control module 502 determines when a new display screen is to be drawn based on, for example, transition rules in the display manager 216. The graphic priority control module 504 determines which events should trigger drawing of selected graphical components (as opposed to the entire screen). For example, the graphic priority control module 504 may initiate drawing of a seatbelt icon only when the seatbelt vehicle data in the data warehouse 218 indicate that the seatbelt is in an unbuckled position. The display manager 216 also includes graphic drawing software 506 that renders the graphic components on the display 104, 112.

Although the above example focuses on trigger conditions that rely on determine which data may be important to a user at any given time, trigger conditions may also be set to prevent dangerous uses of the information available to the driver. In an example embodiment, when a trigger condition detects that the vehicle is in motion, the trigger condition software 500 may send data to the display manager software to prohibit access to applications that are complex to operate and may distract the driver. For example, the trigger condition software 500 may be programmed with a trigger condition that prevents the driver from using the in-vehicle browser while driving.

In addition, trigger conditions may be set for preferences of different drivers of the vehicle. In an example embodiment, personal preferences can be set for vehicle settings for any vehicle component, such as mirror position and driver seat position. As a result, the in-vehicle information system can be programmed to manipulate data as well as simply display it.

Framework-Based Development Process

The development and deployment of an in-vehicle information system using the reusable framework 200 described above will now be described with respect to FIG. 6. Because the framework 200 is reusable and can be adapted to generate an in-vehicle information system for multiple vehicle platforms, a system developer can simply select components among various libraries, data streams, and data sources to assemble a customized information system via an API in the framework 700, avoiding the need to develop the entire system from scratch.

Figure 6:
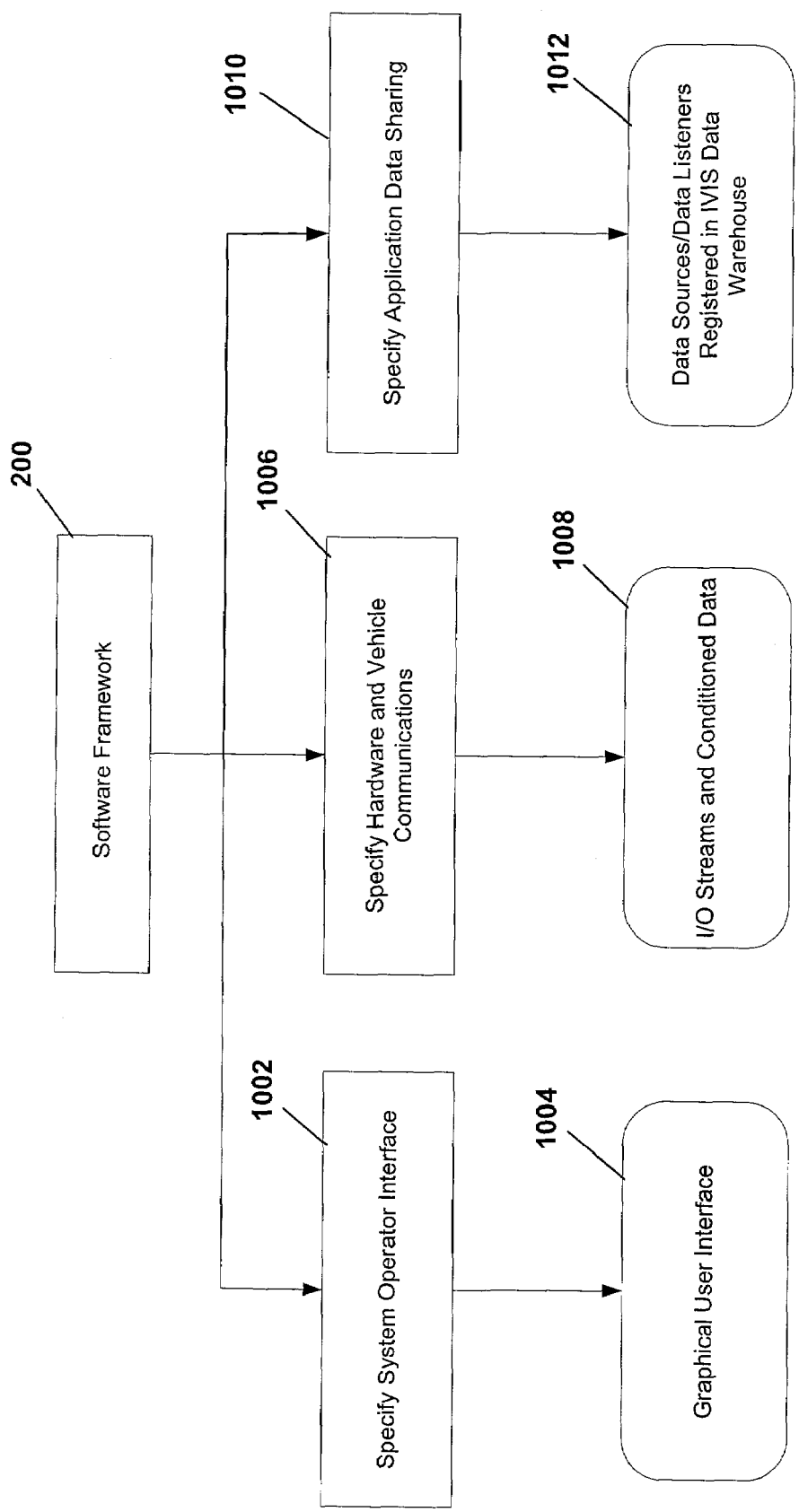
FIG. 6 is a flow diagram illustrating one embodiment of a process for deploying an in-vehicle information system using the framework shown in FIGS. 2 through 4.

Referring to FIG. 6, a developer first may specify a user interface (block 1002). This allows the developer to determine the appearance of a graphical user interface 1004 to be displayed on the display 104, 112 as well as the rules for transitioning between screens. In one embodiment, the developer selects among choices in the graphics library 408 (FIG. 4, such as graphical objects, icons, gauges, etc., to generate the user interface 1004. The developer may also specify a vehicle hardware platform and the devices that will provide data to be displayed to the user (block 1006). This information stored in the communications manager 212 and is used to generate input-output data streams and conditioned data (block 1008) to control communication between the framework and external devices, as explained above. The developer also specifies data sources and/or data listeners that communicate with vehicle devices and data busses (block 1010) and stores this information in the data warehouse (block 1012).

Once the developer has specified and stored the desired information in their respective libraries (blocks 1004, 1008, 1012), the framework 200 can be used to prototype the in-vehicle information system through an automatic code generation tool. Such a tool can generate code to set the properties of framework components. In addition the tool can generate code to register the components with the framework's sub-system managers for communication, display, and data sharing. The automatic coding tool makes use of the re-configurable framework and constructs components for use with the framework APIs.

Once the prototype system is generated, the developer can write or integrate associated in-vehicle information system applications 204 with the prototype by attaching hardware devices and vehicle busses to the prototype and/or generating simulated devices and busses. In one embodiment, any known simulator can be used transmit values specified to the framework and associated applications. This simulation can test and exercise the interface, in the absence of the actual devices that would provide the data in the actual vehicle environment. The complete in-vehicle information system is then generated using the reusable framework 200 targeted for the specific vehicle platform. This system can then be tested in the actual vehicle.

Because the framework architecture (FIG. 4) includes a platform independence layer 410, only one set of code needs to be written to the framework API, and the resulting code can run on any platform recognized by the platform independence layer 410. Further in one embodiment of the invention, the framework 200 is designed to operate both in a personal computer/desktop environment and a reduced memory and processor environment normally associated with the smaller operating systems of actual embedded processors used in transportation applications. This allows applications built on the inventive framework 200 to be executed in both prototype and deployed embedded systems with equal effectiveness.

In short, all of the sub-systems in the in-vehicle information system can be developed using the infrastructure and extensible components provided by the inventive reusable framework 200. In one embodiment, the graphical user interface 1004 is specified using the system operator interface 1002, the hardware device and vehicle communication (e.g., the input/output streams and conditioned data 1008) is specified using the framework's communications components 1006, and application data sharing parameters 1012 is specified using the framework's filter components 1010 and stored in the data warehouse.

Note that the design pattern of the existing components may be applied to new component variations. The re-use of the software design enables a repository of communication components, data filters, and platform dependent modules to be easily created and maintained.

Thus, the reusable software framework allows an in-vehicle information system to be built and customized by coupling modular application service components into the software framework by, for example, registering or linking those components through the framework's application programmer interface (API). In this way, information from both on vehicle and off-vehicle services can be easily integrated into the same system. Note that the components that are pre-built for known types of vehicle hardware. Examples include standard vehicle data bus hardware and engine control modules. In this case, an in-vehicle information system may be built by selecting these pre-built components from the framework library and registering or linking these components with the framework's management sub-systems.

Because the reusable software framework described above allows reuse of pre-defined, modular components having standard interfaces to construct the in-vehicle information system, a virtually infinite variety of information systems can be constructed from libraries of modular components without requiring customized programming. Note that although the above description focuses on an information system and framework that provides graphical data, the invention may also be used in a non-graphical application without departing from the scope of the invention. For example, the communications and data sharing capabilities described above may be used to generate non-graphical information systems such as monitoring systems, reporting systems, and safety applications.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A framework for a vehicle information system having a user interface, at least one device that generates data to be shown on the user interface as a display, and at least one application, the framework comprising:
    a communications manager in communication with said at least one device;
    a data warehouse in communication with the communications manager, wherein the communications manager manages input and output of data between the data warehouse and said at least one device and wherein the data warehouse registers the data from said at least one device and makes the registered data accessible to said at least one application;
    said application adapted to assign at least one notification condition to said registered data based on programmed rules that determine which data will be displayed during a given condition, and when said condition is assigned to said registered data said application requests display of said data from said warehouse;
    a variable format display in said user interface that allows data having different characteristics and protocols to be displayed in a shared physical display without requiring the use of multiple independent displays; and
    a display manager in communication with the data warehouse and said at least one application, wherein the display manager is programmable to determine which data is to be displayed on said interface display and where within said display said data will be written, and said display manager, based on said condition provided by said at least one application, decides whether to display on the user interface data requested from the data warehouse by said at least one application, wherein said at least one device includes at least one input-output module that generates bus messages having a bus message format, and wherein the communications manager registers said at least one input-output module to allow changes in the bus message format without changing the registered data in the data warehouse.

2. A framework for a vehicle information system having a user interface, at least one device that generates data to be shown on the user interface as a display, and at least one application, the framework comprising:
    a communications manager in communication with said at least one device;
    a data warehouse in communication with the communications manager, wherein the communications manager manages input and output of data between the data warehouse and said at least one device and wherein the data warehouse registers the data from said at least one device and makes the registered data accessible to said at least one application;
    said application adapted to assign at least one notification condition to said registered data based on programmed rules that determine which data will be displayed during a given condition, and when said condition is assigned to said registered data said application requests display of said data from said warehouse;
    a variable format display in said user interface that allows data having different characteristics and protocols to be displayed in a shared physical display without requiring the use of multiple independent displays; and
    a display manager in communication with the data warehouse and said at least one application, wherein the display manager is programmable to determine which data is to be displayed on said interface display and where within said display said data will be written, and said display manager, based on said condition provided by said at least one application, decides whether to display on the user interface data requested from the data warehouse by said at least one application, wherein said at least one device includes at least one device module that generates messages to and from a hardware device, and wherein the communications manager registers said at least one device module to allow changes in the messages without changing the registered data in the data warehouse.

3. The framework of claim 2, wherein the communications manager registers at least one input/output stream for a standard vehicle bus protocol supported by the framework.

4. The framework of claim 2, wherein the communications manager updates the data values registered in the data warehouse in real time.

5. The framework of claim 2, wherein the data warehouse registers on-vehicle data and off-vehicle data accessible by said at least one application.

6. The framework of claim 2, wherein the data registered in the data warehouse is stored independently of a protocol used to obtain the data.

7. The framework of claim 2, wherein the data warehouse further includes a messaging facility to notify at least one application if a predetermined event occurs in the vehicle information system.

8. The framework of claim 2, wherein the display manager comprises a graphics library containing commands to generate the display.

9. The framework of claim 8, wherein the graphics library includes at least one selected from the group consisting of display rendering routines that support drawing commands and real-time embedded graphics display software.

10. The framework of claim 2, further comprising a platform independence layer that separates said at least one device from the communications manager, the data warehouse and the display manager, wherein the platform independence layer acts as an interface that is independent of a platform corresponding to said at least one device.

11. The framework of claim 10, wherein the platform independence layer contains at least one selected from the group consisting of a display interface disposed between the user interface and the display manager and an input/output interface disposed between said at least one device and the communication manager.

12. The framework of claim 2, further comprising at least one filter module that filters data read from or written to said at least one device.

13. The framework of claim 12, wherein the framework includes a plurality of filters coupled together, each filter conducting a different filtering operation on data read from or written to said at least one device.

14. The framework of claim 2, further comprising a system configuration module that registers said at least one device with the communications manager, the data warehouse, and the display manager to control routing of data to and from said at least one device.

15. The framework of claim 14, wherein the framework further comprises a trigger condition module, wherein said at least one device is at least one hardware component, and wherein the system configuration module registers said at least one hardware component to the trigger condition module.

16. The framework of claim 14, wherein said at least one device is at least one user input component and at least one hardware component, and wherein the system configuration module registers said at least one user input component to route data to said at least one hardware component.

* * * * *